US010312961B1

(12) United States Patent
Korol et al.

(10) Patent No.: US 10,312,961 B1
(45) Date of Patent: Jun. 4, 2019

(54) TRANSCEIVER RESONANT RECEIVE SWITCH

(71) Applicant: Integrated Device Technology, Inc., San Jose, CA (US)

(72) Inventors: Victor Korol, San Diego, CA (US); Roberto Aparicio Joo, San Diego, CA (US); Naveen Krishna Yanduru, San Diego, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/841,692

(22) Filed: Dec. 14, 2017

Related U.S. Application Data

(60) Provisional application No. 62/541,908, filed on Aug. 7, 2017.

(51) Int. Cl.
*H04B 1/44* (2006.01)
*H04B 7/08* (2006.01)

(52) U.S. Cl.
CPC ............. *H04B 1/44* (2013.01); *H04B 7/0805* (2013.01)

(58) Field of Classification Search
CPC ..... H04B 1/48; H03F 2200/387; H03H 11/28; H03H 7/38
See application file for complete search history.

(56) References Cited

U.S. PATENT DOCUMENTS

| 4,701,724 | A  | * | 10/1987 | Martin   | H04B 1/48 333/103 |
| 2003/0011443 | A1 | * | 1/2003  | Liu      | H03F 1/56 333/126 |
| 2009/0033435 | A1 | * | 2/2009  | Otani    | H01P 1/15 333/103 |
| 2016/0248470 | A1 | * | 8/2016  | Kunihiro | H03F 3/217 |

OTHER PUBLICATIONS

Voronin et al., "Resonant Switches: Basic Types and Application" ISSN 1068-3712. Russian Electrical Engineering. 2013 (Year: 2013).*
"Electronic Circuits—Diode as a Switch." https://www.tutorialspoint.com/electronic_circuits/electronic_circuits_diode_as_switch.htm (Year: 2019).*

* cited by examiner

*Primary Examiner* — Ross Varndell
(74) *Attorney, Agent, or Firm* — Christopher P. Maiorana, PC

(57) ABSTRACT

An apparatus comprises an input port, an output port, and a resonant receive switch circuit. The resonant receive switch circuit may be coupled between the input port and the output port. The resonant receive switch circuit may comprise a switch and an input matching circuit. When the switch is in a non-conducting state, a signal at the input port is passed to the output port. When the switch is in a conducting state, the signal at the input port is prevented from reaching the output port.

20 Claims, 7 Drawing Sheets

US 10,312,961 B1

TRANSCEIVER RESONANT RECEIVE SWITCH

This application relates to U.S. Provisional Application No. 62/541,908, filed Aug. 7, 2017, which is hereby incorporated by reference in its entirety.

FIELD OF THE INVENTION

The invention relates to wireless communication systems generally and, more particularly, to a method and/or apparatus for implementing a transceiver resonant receive switch.

BACKGROUND

Conventional radio frequency (RF) transceivers include a series transmit switch and a series receive switch to couple an antenna to a transmit chain and a receive chain, respectively, of the transceiver. Because of the magnitude of the transmit power, the series receive switch needs to have high breakdown to isolate the receive chain during transmit mode. Because the series receive switch is in the signal path, the series receive switch increases a noise factor (NF) of the receiver input.

It would be desirable to implement a transceiver resonant receive switch.

SUMMARY

The invention concerns an apparatus comprising an input port, an output port, and a resonant receive switch circuit. The resonant receive switch circuit may be coupled between the input port and the output port. The resonant receive switch circuit may comprise a switch and an input matching circuit. When the switch is in a non-conducting state, a signal at the input port is passed to the output port. When the switch is in a conducting state, the signal at the input port is prevented from reaching the output port.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a transceiver resonant receive switch that may (i) be used in any receive chain, (ii) eliminate a series receive switch in a transceiver front end between an antenna port and an input of a low noise amplifier (LNA), (iii) provide increased ruggedness, (iv) be more robust than a conventional series receive switch, (v) be integrated with a low noise amplifier, (vi) provide a reduced noise factor (NF) relative to a series receive switch, (vii) replace a series receive switch with an L-C resonant reflective switch, (viii) operate without a negative voltage generator, (ix) occupy less die area, (x) allow tuning to optimize performance at a particular frequency, and/or (xi) be implemented as one or more integrated circuits.

In wireless systems, a front-end module (FEM) provides an interface between an antenna and an RF transceiver. A FEM typically includes power amplifiers, switches, low-noise amplifiers, control circuitry, and passive elements. Wireless infrastructure, time division duplex (TDD) active antenna systems, and small cell base stations can involve switching high power levels (e.g., 35 dBm) at high frequencies (e.g., >2 GHz). The number of RF switch devices per phone has increased with the shift to 4G, or long-term evolution (LTE), and may be expected to grow with the introduction of 5G applications. A majority of the switches going into cellular (or smart) telephones are Silicon on Insulator (SOI). Radio frequency (RF) Silicon on Insulator (SOI) has rapidly evolved as a mainstream technology for switches used in wireless applications. Although RF switches may utilized a variety of technologies, field effect transistor (FET) switches are typically used in cellular applications to lower power demand and extend battery life.

Figure 1:
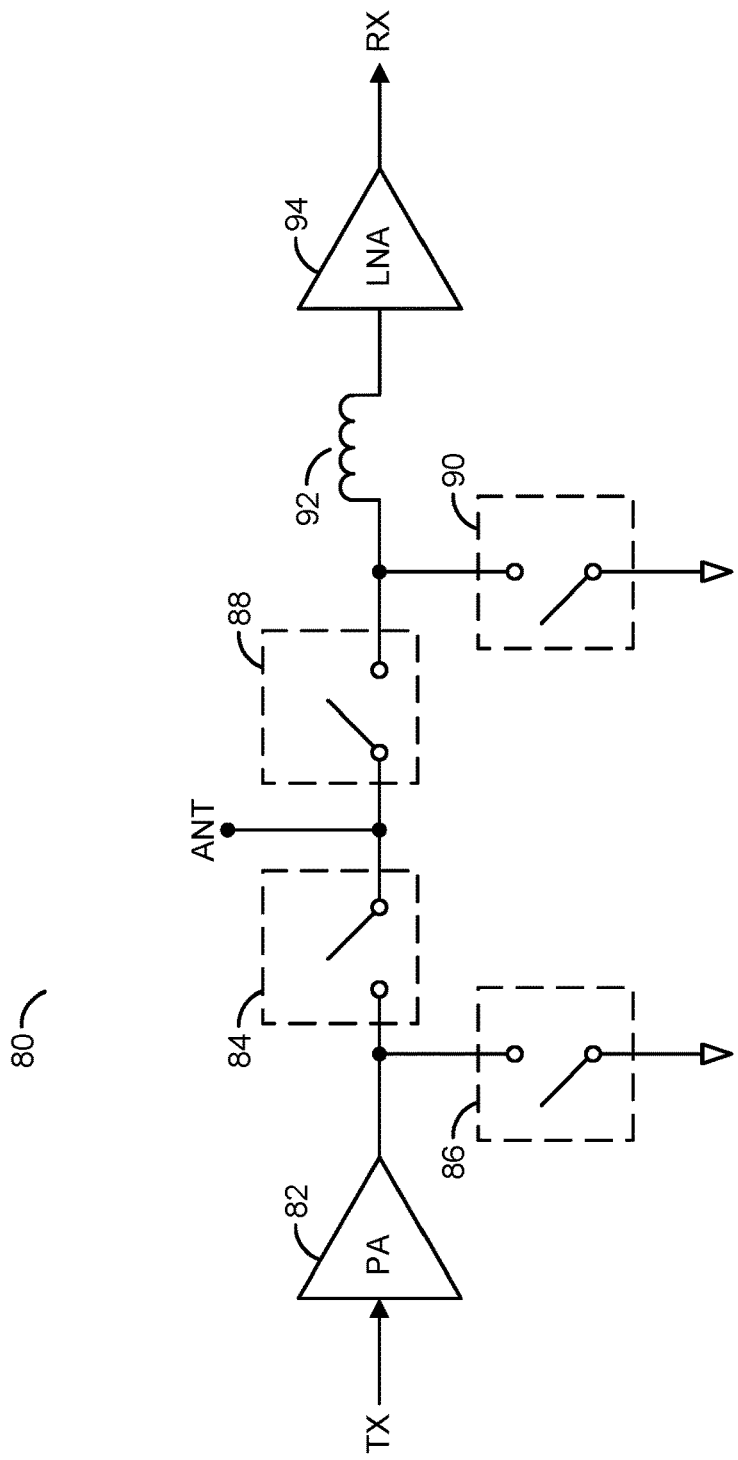
FIG. 1 is a diagram illustrating a typical RF transceiver front end circuit.

Referring to FIG. 1, a diagram of a circuit 80 is shown illustrating a typical radio frequency (RF) transceiver front end architecture. In an example, the circuit 80 may be implemented as a single-pole double throw (SPDT) switch. However, other numbers of poles and/or throws may be implemented accordingly to meet design criteria of particular applications. In an example, the circuit 80 may comprise a power amplifier (PA) 82, a series transmit switch 84, a shunt transmit switch 86, a series receive switch 88, a shunt receive switch 90, an input matching inductor 92, and a low noise amplifier (LNA) 94. The switches 84, 86, 88, and 90 are generally implemented by large numbers of series connected (or stacked) devices. The PA 82 is generally configured to ensure enough power is available for a signal or message to reach a destination. The LNA 94 is generally configured to amplify small signals received from an antenna (ANT) for subsequent processing. The switches 84, 86, 88, and 90 are used to route the signals between the PA 82, the LNA 94, and the antenna.

The switches 84, 86, 88, and 90 are generally implemented by large numbers of series connected (or stacked) devices. In an OFF state, the large number of stacked devices forming the switch 88 is needed to withstand the high input power levels (e.g., over 40 dBm) generally associated with transmitting wireless communications signals. The relatively high input voltage (e.g., $P=V^2/R$) is spread out among the individual devices in the stack making up the switch 88, reducing the voltage across each individual device, and preventing breakdown. Stacking the devices is important because the drain-to-source breakdown voltage ($BV_{DS}$) and the drain-to-gate breakdown voltage ($BV_{DG}$) of a single transistor (e.g., FET, etc.) may be on the order of 2 to 4 volts depending on the particular process technology. In an example, each of the switches 84, 86, 88, and 90 may be implemented as a stack of 24 devices (e.g., transistors). However, other numbers of stacked devices may be used to meet design criteria of a particular application. The switch 80 generally occupies a large die area due to the high number of stacked devices. The high number of stacked devices making up the switches 84, 86, 88, and 90 generally has negative effects through substrate loss and parasitic substrate capacitance due to the large device size and high stacking.

The power amplifier 82 may be part of a transceiver transmit chain. The low noise amplifier 94 may be part of a transceiver receive chain. An output of the power amplifier 82 may be coupled to a first terminal of the series transmit switch 84 and a first terminal of the shunt transmit switch 86. A second terminal of the series transmit switch 84 may be coupled to an antenna port (ANT) and a first terminal of the series receive switch 88. A second terminal of the series receive switch 88 may be coupled to a first terminal of the shunt receive switch 90 and a first terminal of the input matching inductor 92. A second terminal of the input matching inductor 92 may be coupled to an input of the LNA 94. A second terminal of the shunt transmit switch 86 and a second terminal of the shunt receive switch 90 may be coupled to a circuit ground potential.

In an example, the PA 82 may represent an output end of the transceiver transmit chain and the LNA 94 may represent an input end of the transceiver receive chain. In a transmit mode, the series transmit switch 84 is in a conducting state (e.g., closed or ON), the shunt transmit switch 86 is in a non-conducting state (e.g., open or OFF), the series receive switch 88 is in a non-conducting state (e.g., open or OFF), and the shunt receive switch 90 is in a conducting state (e.g., closed or ON). In a receive mode, the series transmit switch 84 is in a non-conducting state (e.g., open or OFF), the shunt transmit switch 86 is in a conducting state (e.g., closed or ON), the series receive switch 88 is in a conducting state (e.g., closed or ON), and the shunt receive switch 90 is in a non-conducting state (e.g., open or OFF). Because of the magnitude of the transmit power, the series receive switch 88 generally needs to have a high breakdown rating to isolate the receive chain during the transmit mode. Because the series receive switch 88 is directly in the signal path of the receive chain, the series receive switch 88 directly contributes to insertion loss (IL) and noise figure (NF) ratings of the receiver input.

Figure 2:
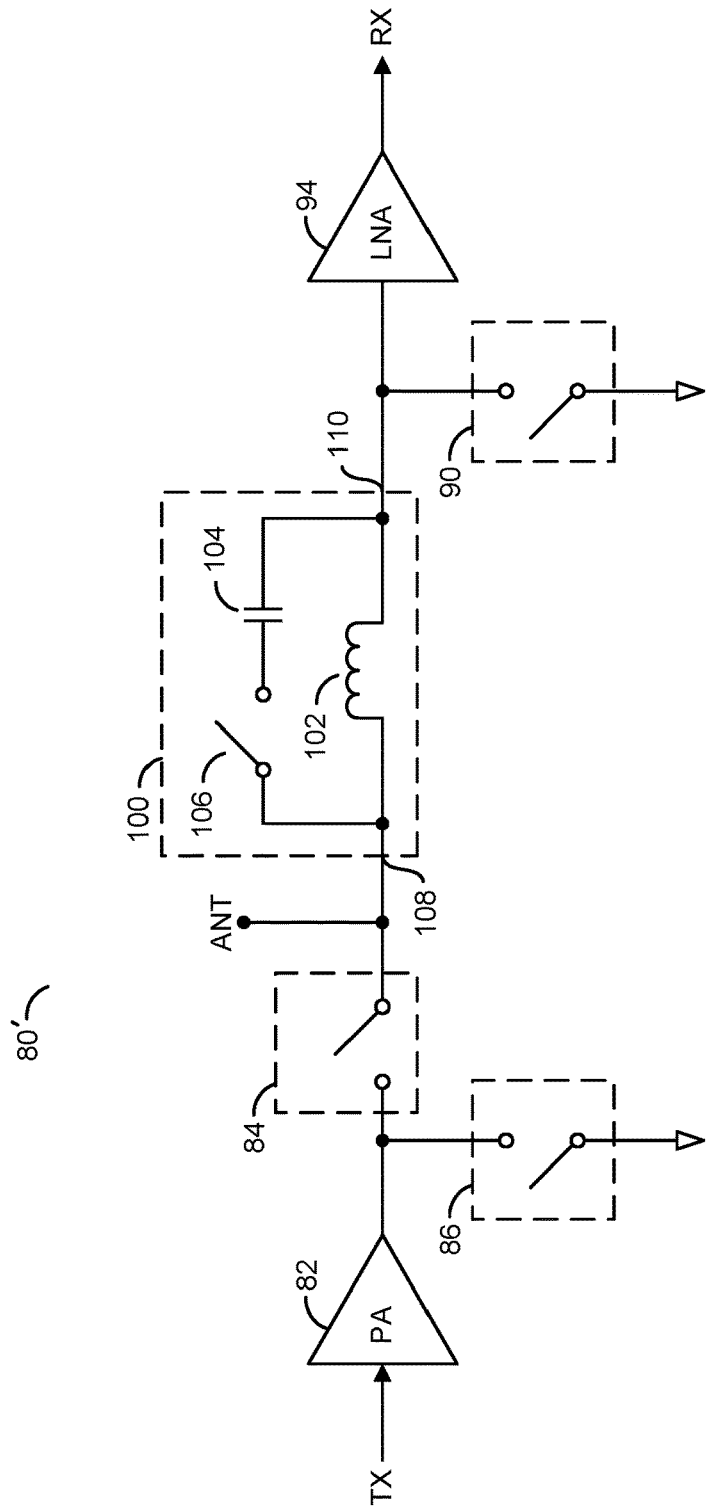
FIG. 2 is a diagram illustrating an example implementation of a transceiver front end circuit in accordance with an example embodiment of the invention.

Referring to FIG. 2, a diagram of a circuit 80' is shown illustrating the circuit 80 of FIG. 1 modified to include an example implementation of a resonant receive switch in accordance with an example embodiment of the invention. In an example, the circuit 80' may be implemented similarly to the circuit 80, except that the series receive switch 88 may be replaced by a resonant receive switch circuit 100 implemented in accordance with an example embodiment of the invention. In an example, the resonant receive switch circuit 100 may comprise an input matching inductor 102, a capacitor 104 and a switch 106. The input matching inductor 102 generally corresponds to or takes the place of the input matching inductor 92. In applications where an input matching inductor is already present as part of the topology of the low noise amplifier block implementing LNA 94, the circuit 100 may be implemented by adding the capacitor 104 and switch 106 across the input matching inductor of the low noise amplifier block implementing the LNA 94.

In an example, the resonant receive switch circuit 100 may comprise an input port 108 and an output port 110. The input port 108 may be coupled to the antenna port ANT. The output port 110 may be coupled to the first terminal of the shunt receive switch 90 and the input of the LNA 94. The shunt receive switch 90 generally provides protection (e.g., gate protection) to sensitive input circuitry of the LNA 94 during operation in the transmit mode. In some embodiments, the shunt receive switch 90 may be omitted. In some embodiments, both the shunt receive switch 90 and the shunt transmit switch 86 may be omitted. The input matching inductor 102 may be coupled between the input port 108 and the output port 110 of the resonant receive switch circuit 100. The capacitor 104 and the switch 106 may be coupled in series across the input matching inductor 102. In a transmit mode, the switch 106 and the shunt receive switch 90 (if implemented) are generally placed in a conducting state (e.g., closed or ON). In a receive mode, the switch 106 and the shunt receive switch 90 (if implemented) are generally placed in a non-conducting state (e.g., open or OFF).

The resonant receive switch circuit 100 generally (a) passes a signal received at the input port 108 (e.g., from the antenna port ANT) to the output 100 (e.g., for presentation to the input of the LNA 94) when operating in the receive mode and (b) blocks (e.g., reflects) the signal received at the input port 108 when operating in the transmit mode. In general, the input matching inductor 102 is placed in a resonant state by coupling the capacitor 104 across the input matching inductor 102 when operating in the transmit mode. In various embodiments, the capacitor 104 is generally selected to provide parallel resonance with the input matching inductor 102 to produce high impedance at a predetermined frequency band of a transmit signal being presented to the antenna port ANT (e.g., via the series transmit switch 84). In some embodiments, the input matching inductor 102 may be implemented using a high quality factor (High-Q) inductor that is external to or already included in the LNA 94. High-Q inductors generally help in attaining good noise figures. In an example embodiment, the input matching inductor 102 may be implemented having a quality factor (Q) of about 30. However, other inductors with various quality factors may be utilized to meet the design criteria of a particular application.

In the transmit mode, the switch 106 is generally in the conducting state (e.g., closed or ON). Since the switch 106 is in the conducting state, the switch 106 presents a low equivalent series resistance and, therefore, does not develop a significant voltage drop due to the transmit signal. Because the switch 106 does not develop a significant voltage drop in the transmit mode, the switch 106 may be implemented using a switch device that is smaller than a conventional series receive switch. Since the switch 106 is not in the signal path when the resonant receive switch circuit 100 is operating in the receive mode, insertion loss and noise figure ratings of the receiver input are generally not increased by the switch 106. Thus, the resonant receive switch circuit 100 generally provides a more robust, more rugged, and lower noise figure front end circuit when compared with conventional front end circuits. Because receiver chains generally already include an input matching inductor and the switch 106 may be smaller than a conventional series receive switch, the resonant receive switch circuit 100 may reduce the overall circuit area needed for implementation.

In an example, the transceiver front end circuit 80' may be configured for operation with a single-ended power supply. In an example, a positive supply voltage (e.g., 0-3V) may be used to control (operate) the switches forming the circuit 80'. By allowing control using a single-ended supply voltage, a negative voltage generator may be eliminated, further reducing the die area occupied by the front end circuit 80'. In an example embodiment, the switches 84, 86, 90, and 106 may be implemented using n-channel metal-oxide-semiconductor (NMOS) transistors. However, many other types of devices and/or technologies (e.g., CMOS, PMOS, SOI, bipolar, SiGe, GaAs, pHEMT, etc.) may be implemented accordingly to meet the design criteria of a particular implementation.

Figure 3:
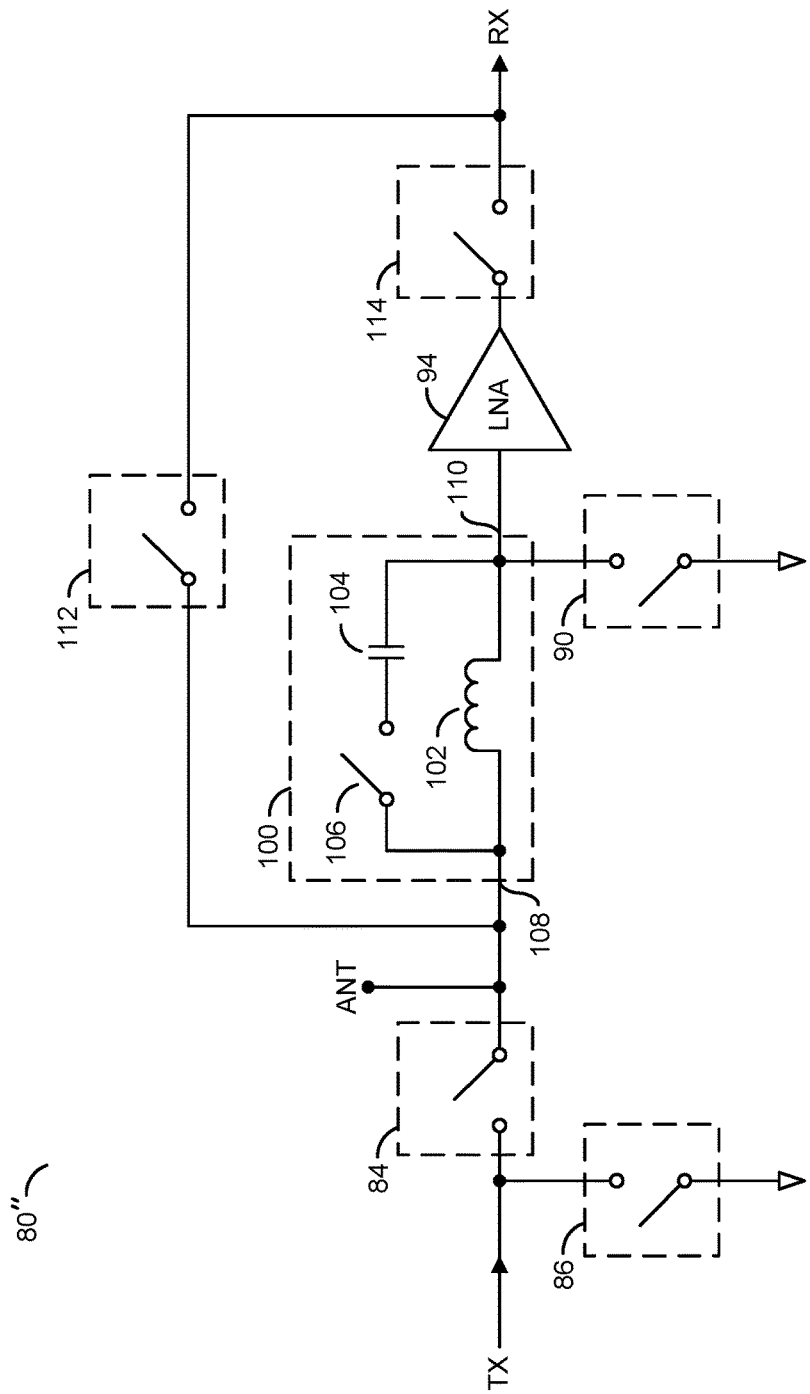
FIG. 3 is a diagram illustrating another example implementation of a transceiver front end circuit in accordance with an example embodiment of the invention.

Referring to FIG. 3, a diagram of a circuit 80″ is shown illustrating another example implementation of a transceiver front end circuit including a resonant receive switch circuit in accordance with an example embodiment of the invention. In another example, the circuit 80″ may be implemented similarly to the circuit 80′, except that the circuit 80″ may further comprise a bypass switch 112 and a series output switch 114. In an example, a first terminal of the bypass switch 112 may be coupled to the connection between the antenna port ANT and the input port 108, and a second terminal of the bypass switch 112 may be coupled to a first terminal of the series output switch 114. A second terminal of the series output switch 114 may be coupled to an output of the LNA 94.

In various embodiments, the switches 112 and 114 may be used to include the LNA 94 and the circuit 100 in the receive chain or exclude (bypass) the LNA 94 and the circuit 100 from the receive chain. When the LNA 94 and the circuit 100 are to be included in the receive chain, the switch 112 may be placed in a non-conducting state (e.g., OPEN) and the switch 114 may be placed in a conducting state (e.g., CLOSED). When the LNA 94 and the circuit 100 are to be excluded from the receive chain (e.g., the antenna ANT connected directly to circuitry following the LNA 94), the switch 112 may be placed in the conducting state (e.g., CLOSED) and the switch 114 may be placed in the non-conducting state (e.g., OPEN).

Figure 4:
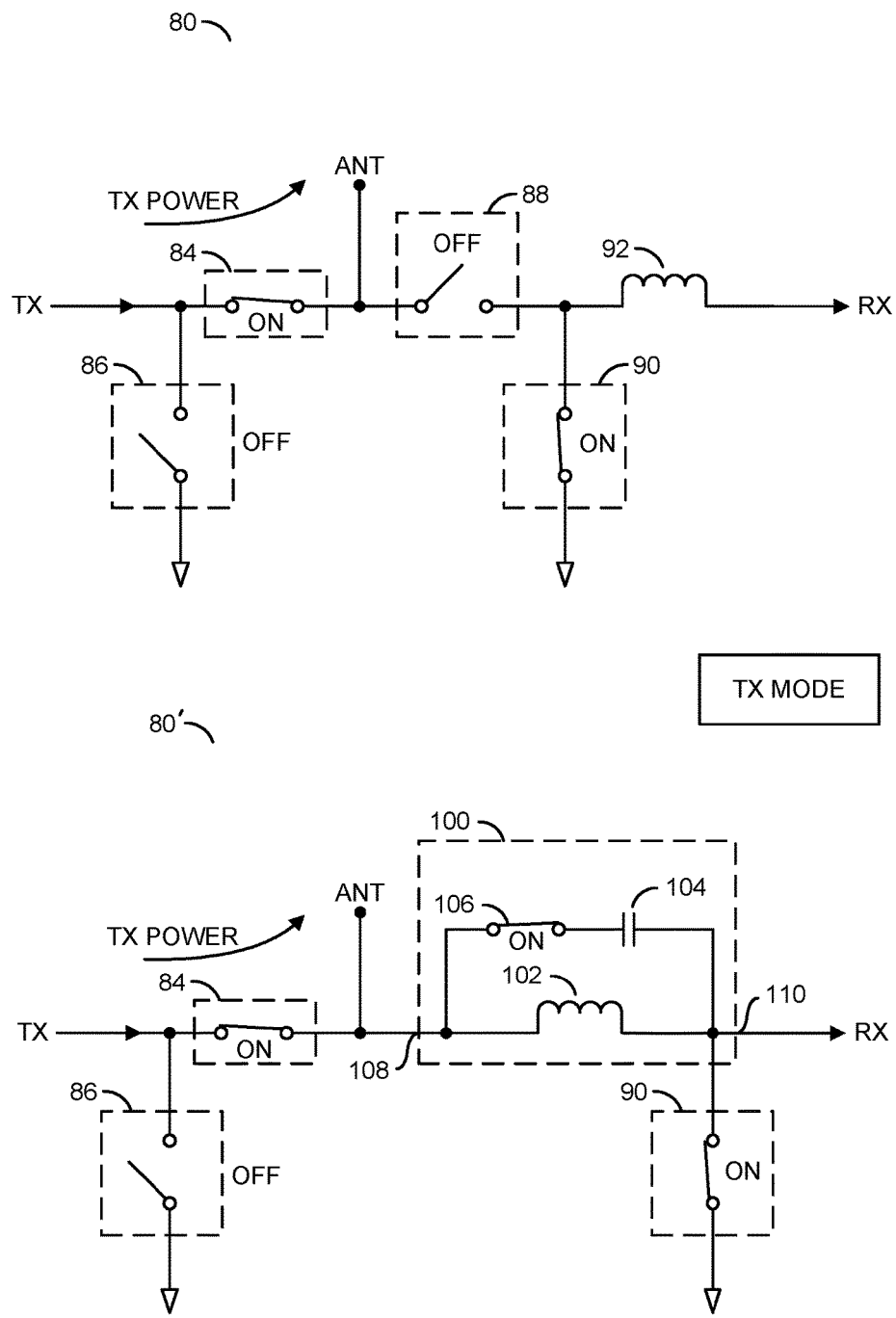
FIG. 4 is a diagram comparing a transmit mode operation for the front end circuits of FIGS. 1 and 2.

Referring to FIG. 4, a diagram is shown illustrating a comparison between transmit mode operations for the front end circuits 80 and 80′ of FIGS. 1 and 2. In the transmit mode of the circuit 80, the series transmit switch 84 is in a conducting state (e.g., closed or ON), the shunt transmit switch 86 is in a non-conducting state (e.g., open or OFF), the series receive switch 88 is in a non-conducting state (e.g., open or OFF), and the shunt receive switch 90 is in a conducting state (e.g., closed or ON). The switch 88 is generally implemented by a large number of series connected (or stacked) devices. In an OFF state, the large number of stacked devices is needed to withstand the high input power levels (e.g., over 40 dBm) associated with transmitting wireless communications signals. The relatively high input voltage (e.g., $P=V^2/R$) is spread out among the individual devices in the stack, reducing the voltage across each individual device, preventing breakdown. The switch 88 generally occupies a large die area due to the high number of stacked devices. Because the switch 88 is in the receive signal path (e.g., in series with the input matching inductor 92), the switch 88 generally has a negative effect (e.g., through substrate loss and parasitic substrate capacitance due to the large device size and high stacking) on the insertion loss and noise figure for the input of the LNA 94.

In contrast to the circuit 80, when the circuit 80′ is in the transmit mode, the switch 106 and the switch 90 (if implemented) are placed in the conducting state (e.g., closed or ON). Since the switch 106 is in the conducting state, the switch 106 presents a low equivalent series resistance and, therefore, does not develop a significant voltage drop due the transmit signal. Because the switch 106 does not develop a significant voltage drop in the transmit mode, the switch 106 may be implemented using a switch device that is smaller than a conventional series receive switch. Thus, the resonant receive switch circuit 100 generally provides a more robust, more rugged, and lower noise factor front end circuit.

Figure 5:
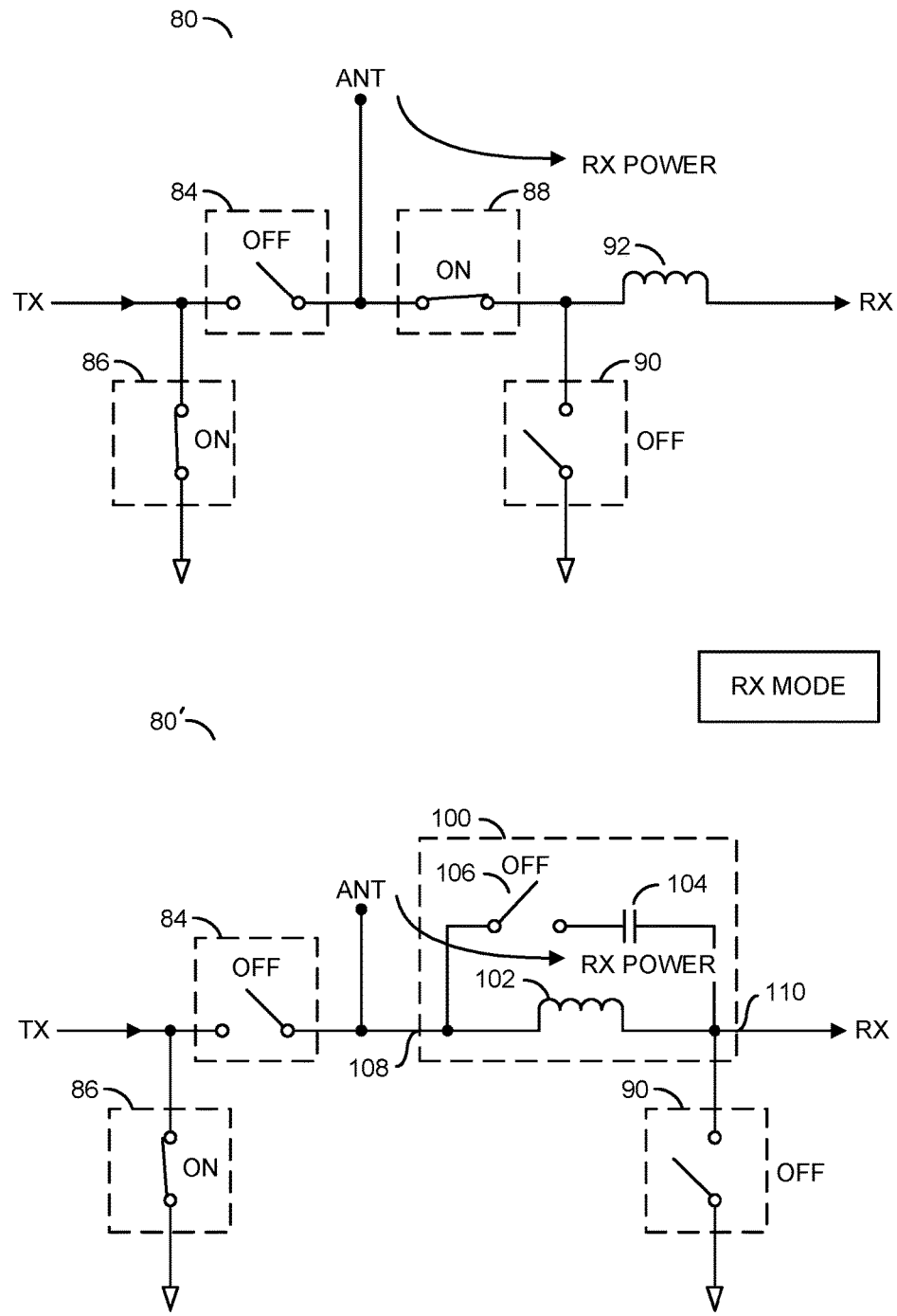
FIG. 5 is a diagram comparing a receive mode operation for the front end circuits of FIGS. 1 and 2.

Referring to FIG. 5, a diagram is shown illustrating a comparison between receive mode operations for the front end circuits 80 and 80′ of FIGS. 1 and 2. In the receive mode of the circuit 80, the series transmit switch 84 is in the non-conducting state (e.g., open or OFF), the shunt transmit switch 86 (if implemented) is in the conducting state (e.g., closed or ON), the series receive switch 88 is in the conducting state (e.g., closed or ON), and the shunt receive switch 90 (if implemented) is in the non-conducting state (e.g., open or OFF). In the receive mode, the RX power received at the antenna generally passes through the switch 88 and is communicated to the receive chain through the input matching inductor 92. The switch 88 generally occupies a large die area due to the large size and/or high number of stacked devices. Because the switch 88 is in the receive signal path (e.g., in series with the input matching inductor 92 at the input of the LNA 94), the switch 88 may negatively affect (e.g., through channel resistance, substrate loss, and parasitic substrate capacitance due to the large device size and high stacking) the insertion loss and/or noise figure ratings of the receive chain.

In contrast to the circuit 80, when the circuit 80′ is in the receive mode, the switch 106 and the switch 90 (if implemented) are placed in the non-conducting state (e.g., open or OFF). In the receive mode, the RX power received at the input port 108 generally bypasses the switch 106 and is communicated to the receive chain through the input matching inductor 102. Since the switch 106 is not in the direct signal path during receive mode operation, the switch 106 generally does not affect the insertion loss and/or the noise figure ratings of the receive chain coupled to the output port 110.

Figure 6:
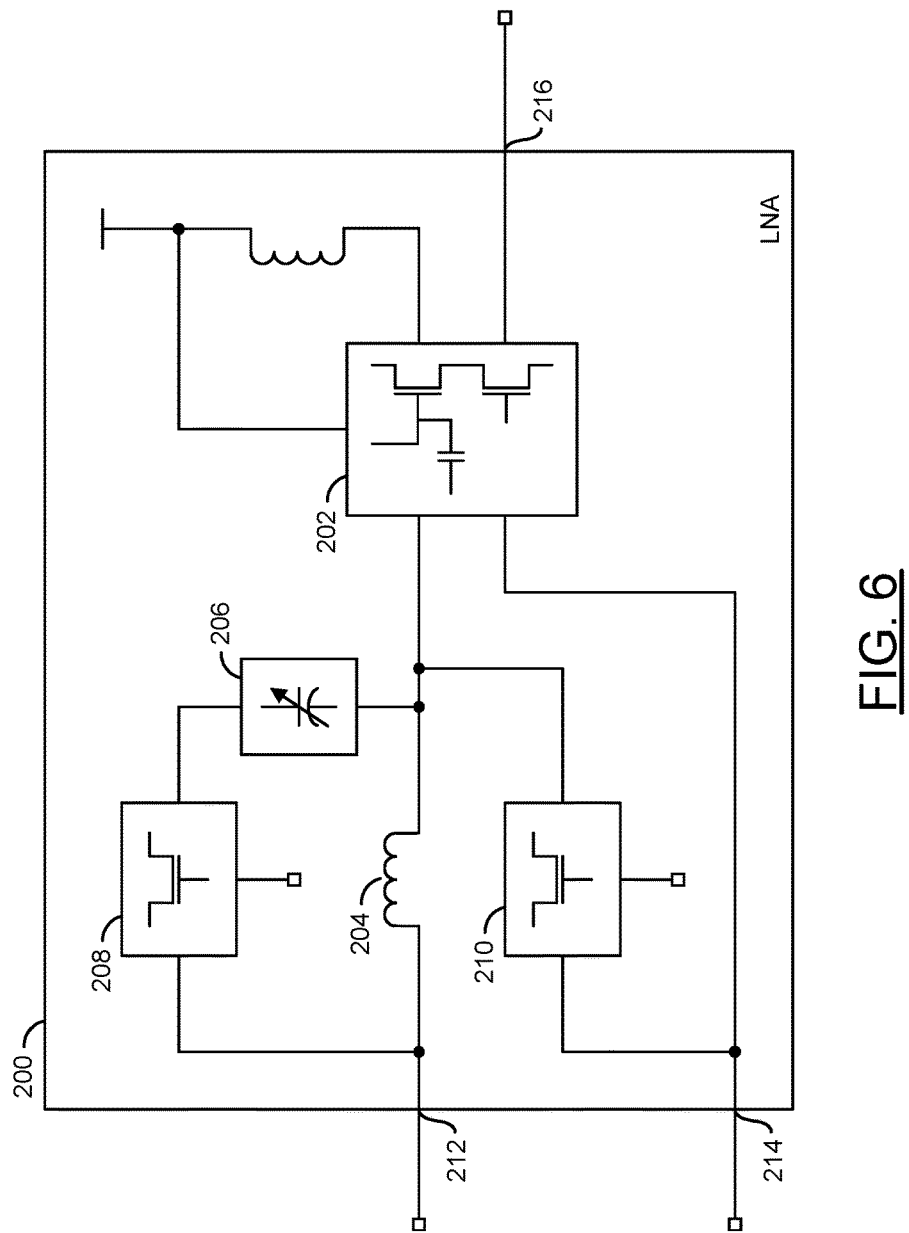
FIG. 6 is a diagram illustrating an amplifier combined with an example implementation of a resonant receive switch in accordance with an example embodiment of the invention.

Referring to FIG. 6, a diagram of a circuit 200 is shown illustrating an example implementation of an amplifier incorporating a resonant receive switch circuit implemented in accordance with an example embodiment of the invention. In an example, the circuit 200 may comprise a low noise amplifier (LNA) 202, an input matching inductor 204, a resonator block 206, and a resonator switch 208. The circuit 200 may also comprise a gate protection shunt switch 210.

In an example, an input of the LNA 202 may be coupled to an input terminal (or pad) 212 by the input matching inductor 204. A first terminal of the resonator block 206 may be coupled to the input of the LNA 202. A second terminal of the resonator block 206 may be coupled to a first terminal of the resonator switch 208. A second terminal of the resonator switch 208 may be coupled to the input terminal 212. Thus, the resonator block 206 and the resonator switch 208 are coupled in series across the input matching inductor 204. In an example, the gate protection shunt switch 210 may be coupled between the input of the LNA 202 and a circuit ground terminal 214. The LNA 202 may also have a connection to the circuit ground pad 214. An output of the LNA 202 may be coupled to an output terminal (or pad) 216 of the integrated circuit 200.

In an example, a low noise amplifier and a resonant receive switch circuit implemented in accordance with an example embodiment of the invention may be combined (integrated) in a single integrated circuit, or instantiated as a part of a larger integrated circuit (e.g., a transceiver front end circuit). In an example, the resonator block 206 may be implemented as a variable (or tunable) resonator to facilitate more precise resonance with the input matching inductor 204. In an example, the resonator block 206 may comprise a number of elements (e.g., capacitors) that may be selected (or tuned) to provide a particular resonator value. In an example, the elements may be tuned, for example, using configuration bits, fuse/anti-fuse technology, or some other method of selection to provide resonance with the input matching inductor 204 to present a high impedance at a predetermined frequency band of a signal being presented to the input terminal 212. In an example, the resonator switch 208 and the gate protection switch 210 may be implemented using many types and/or technologies of devices (e.g., CMOS, NMOS, PMOS, SOI, bipolar, SiGe, GaAs, pHEMT, etc.). In some embodiments, the circuit 200 may be configured to allow operation with a single-ended power supply.

Figure 7:
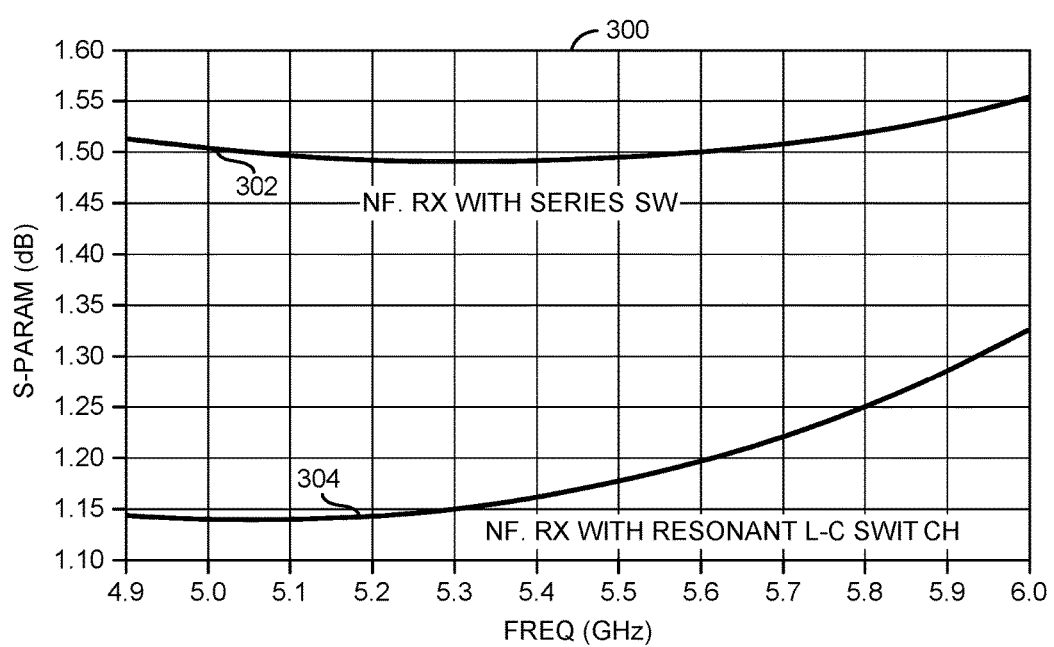
FIG. 7 is a diagram comparing performance of a transceiver front end circuit in accordance with an example embodiment of the invention and a conventional front end circuit.

Referring to FIG. 7, a diagram of a graph 300 is shown comparing performance of a transceiver front end circuit comprising a resonant receive switch in accordance with an example embodiment of the invention and a front end circuit comprising a series receive switch. A curve 302 illustrates a noise figure (NF) for a receiver with a series receive switch over a frequency range of 4.9 to 6.0 GHz. A curve 304 illustrates a noise figure (NF) for a receiver with a resonant receive switch in accordance with an example embodiment of the invention over the frequency range of 4.9 to 6.0 GHz.

Noise figure and noise factor are measures of degradation of a signal-to-noise ratio (SNR), caused by components in a radio-frequency signal chain. In general, the performance of an amplifier or a radio receiver may be specified by providing a number representing the noise figure or noise factor, with lower values indicating better performance. In conventional front end modules, a loss of the series receive switch contributes directly to the noise figure of the receiver. In various embodiments, a resonant receive switch in accordance with an example embodiment of the invention provides an improved (lower value) noise figure compared to conventional series receive switch. In general, various embodiments of the invention may be utilized in any receive chain where a switch is implemented to provide a time division duplex (TDD) function.

In various embodiments, the conventional series receive switch is removed from the direct receive path while maintaining the switching function by connecting a switch and capacitor in series across the input matching inductor that is generally already present in the receive chain LNA. Because the switch is not in the direct signal path, the switch does not directly contribute to (degrade) the noise figure of the receive chain.

In various embodiments, a method and/or apparatus providing a transceiver resonant receive switch circuit is disclosed. The transceiver resonant receive switch circuit may be used in any receive chain. The transceiver resonant receive switch circuit may be utilized to eliminate a series receive switch in a transceiver front end between an antenna port and an input of a low noise amplifier (LNA). The transceiver resonant receive switch circuit may be integrated within a low noise amplifier integrated circuit, and provide a reduced noise factor (NF) relative to operation with a series receive switch. In some embodiments, the series receive switch is replaced with an L-C resonant reflective switch. In some embodiments, the transceiver resonant receive switch circuit may allow tuning to optimize performance at a particular frequency.

Although embodiments of the invention have been described in the context of a 5G application, the present invention is not limited to 5G applications, but may also be applied in other high data rate wireless and wired communications applications where different rapid switching, multiple channel, and multiple user issues may exist. The present invention addresses concerns related to high speed wireless communications, mobile and stationary transceivers and point-to-point links. Future generations of wireless communications applications using radio frequency (RF), microwave, and millimeter-wave links can be expected to provide increasing speed, increasing flexibility, and increasing numbers of interconnections and layers. The present invention may also be applicable to wireless communications systems implemented in compliance with either existing (legacy, 2G, 3G, 4G) specifications or future specifications.

The terms "may" and "generally," when used herein in conjunction with "is(are)" and verbs, are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an input port;
    an output port; and
    a resonant receive switch circuit coupled between the input port and the output port, said resonant receive switch circuit comprising a switch and an input matching circuit, wherein (i) said switch is ac coupled between said input port and said output port, (ii) when said switch is in a non-conducting state, a signal at the input port is passed to the output port, and (iii) when said switch is in a conducting state, the signal at the input port is reflected.

2. The apparatus according to claim 1, wherein:
    said input matching circuit comprises an input matching inductor and a shunt capacitor;
    said input matching inductor is coupled between said input port and said output port;
    said shunt capacitor is coupled in series with said switch across said input matching inductor; and
    said shunt capacitor is configured to place said input matching inductor in a resonant state when said switch is in said conducting state.

3. The apparatus according to claim 2, wherein said capacitor is selected to provide resonance with said input matching inductor at a predetermined frequency band.

4. The apparatus according to claim 1, further comprising a transceiver circuit, wherein:
    a transmitter output of said transceiver circuit and said input port are connected to an antenna; and
    said output port is connected to a receiver input of said transceiver circuit.

5. The apparatus according to claim 4, wherein said switch is in said conducting state in a transmit mode of said apparatus and in said non-conducting state in a receive mode of said apparatus.

6. The apparatus according to claim 5, wherein said resonant receive switch circuit is configured to present a high impedance in response to said signal at said input port in said transmit mode and pass said signal at said input port in said receive mode.

7. The apparatus according to claim 1, wherein said apparatus is part of an integrated receive switch and low noise amplifier.

8. The apparatus according to claim 1, further comprising:
a shunt receive switch coupled between the output port and a circuit ground, wherein said shunt receive switch is in a conducting state when said switch of said resonant receive switch circuit is in said conducting state and in a non-conducting state when said switch of said resonant receive switch circuit is in said non-conducting state.

9. A transceiver front end circuit comprising:
an antenna port;
an output port; and
a resonant receive switch circuit coupled between the antenna port and the output port, said resonant receive switch circuit comprising a switch and an input matching circuit, wherein (i) said switch is ac coupled between the antenna port and the output port, (ii) when said switch is in a non-conducting state, a signal at said antenna port is passed to said output port, and (iii) when said switch is in a conducting state, the signal at said antenna port is reflected.

10. The transceiver front end circuit according to claim 9, wherein said switch of said resonant receive switch circuit is in said conducting state in a transmit mode and in said non-conducting state in a receive mode.

11. The transceiver front end circuit according to claim 10, wherein said resonant receive switch circuit is configured to present a high impedance in response to said signal at said antenna port in said transmit mode and pass said signal at said antenna port in said receive mode.

12. The transceiver front end circuit according to claim 9, further comprising:
a low noise amplifier coupled to said output port.

13. The transceiver front end circuit according to claim 9, further comprising:
a shunt receive switch coupled between said output port and a circuit ground, wherein said shunt receive switch is in a conducting state when said switch of said resonant receive switch circuit is in said conducting state and in a non-conducting state when said switch of said resonant receive switch circuit is in said non-conducting state.

14. The transceiver front end circuit according to claim 9, further comprising:
an input port;
a series transmit switch coupled between said input port and said antenna port; and
a shunt transmit switch coupled between said input port and a circuit ground.

15. The transceiver front end circuit according to claim 14, further comprising:
a power amplifier coupled to said input port.

16. A transceiver low noise amplifier circuit comprising:
an input terminal; and
a resonant receive switch circuit configured to couple said input terminal to an input of the low noise amplifier, said resonant receive switch circuit comprising a switch and an input matching circuit, wherein (i) said switch is ac coupled between said input terminal and said input of said low noise amplifier, (ii) when said switch is in a non-conducting state, a signal at said input terminal is passed to said low noise amplifier, and (iii) when said switch is in a conducting state, the signal at said input terminal is reflected.

17. The transceiver low noise amplifier circuit according to claim 16, wherein said input matching circuit comprises an input matching inductor that is placed in a resonant state by a shunt capacitor when said switch is in said conducting state.

18. The transceiver low noise amplifier circuit according to claim 16, wherein said resonant receive switch comprises:
an input matching inductor; and
a capacitor, wherein said switch of said resonant receive switch circuit is configured to connect said capacitor across said input matching inductor in a transmit mode and disconnect said capacitor in a receive mode.

19. The transceiver low noise amplifier circuit according to claim 18, wherein said capacitor is selected to provide resonance with said input matching inductor at a predetermined frequency band.

20. The transceiver low noise amplifier circuit according to claim 16, further comprising:
a shunt receive switch coupled between said input of the low noise amplifier and a circuit ground, wherein said shunt receive switch is in a conducting state when said switch of said resonant receive switch circuit is in said conducting state and in a non-conducting state when said switch of said resonant receive switch circuit is in said non-conducting state.

* * * * *